350-432

OR 4,035,063

United States

Ikeda 4,035,063

July 12, 1977

[54] COMPACT WIDE-ANGLE PHOTOGRAPHIC LENS SYSTEM WITH A SHORT OVERALL LENGTH

[75] Inventor: Yoshitsugi Ikeda, Hachiouji, Japan

[73] Assignee: Olympus Optical Co., Ltd., Japan

[21] Appl. No.: 577,017

[22] Filed: May 13, 1975

[30] Foreign Application Priority Data

May 14, 1974 Japan .............................. 49-52837

[51] Int. Cl.² ............................................ G02B 3/04
[52] U.S. Cl. ................................ 350/189; 350/223; 350/228
[58] Field of Search ........... 350/189, 228, 222, 223

[56] References Cited

U.S. PATENT DOCUMENTS

| 2,762,262 | 9/1956 | Bertele | 350/228 |
| 2,833,181 | 5/1958 | Bertele | 350/228 |
| 3,028,793 | 4/1962 | Bousky et al. | 350/189 |

Primary Examiner—John K. Corbin
Assistant Examiner—Conrad Clark
Attorney, Agent, or Firm—Cushman, Darby & Cushman

[57] ABSTRACT

A compact wide-angle photographic lens system with a short overall length comprising a transparent plate member having at least one surface formed as an aspherical surface expressed by the following formulas for which aberrations are corrected favorably.

8 Claims, 23 Drawing Figures

SPHERICAL ABERRATION   ASTIGMATISM   DISTORTION

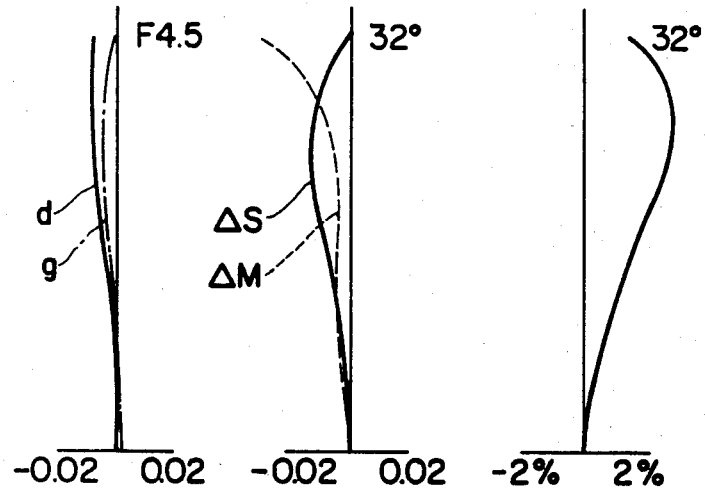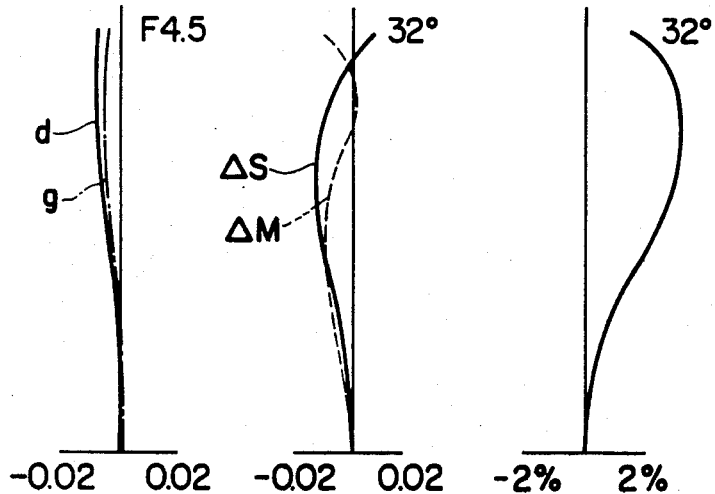

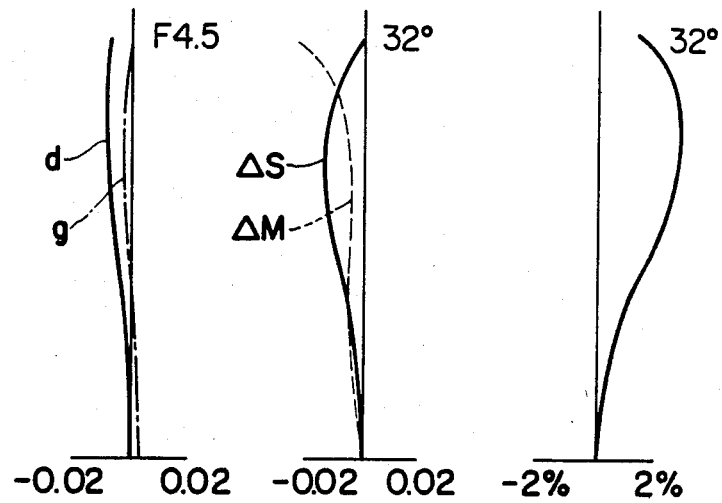
FIG. 5A SPHERICAL ABERRATION
FIG. 5B ASTIGMATISM
FIG. 5C DISTORTION
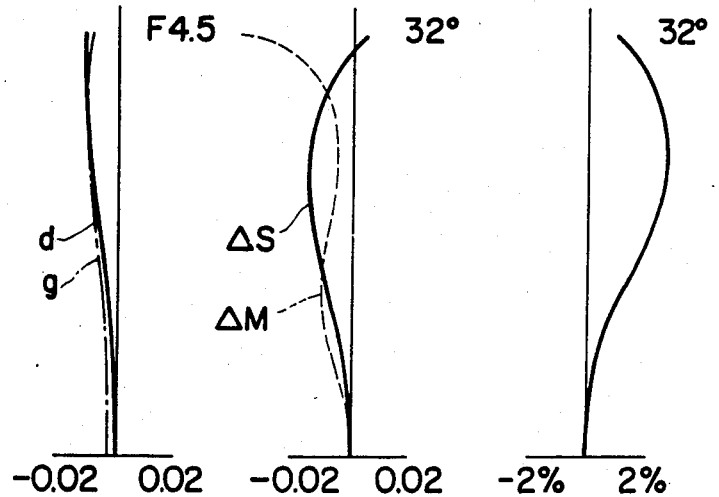
FIG. 6A SPHERICAL ABERRATION
FIG. 6B ASTIGMATISM
FIG. 6C DISTORTION

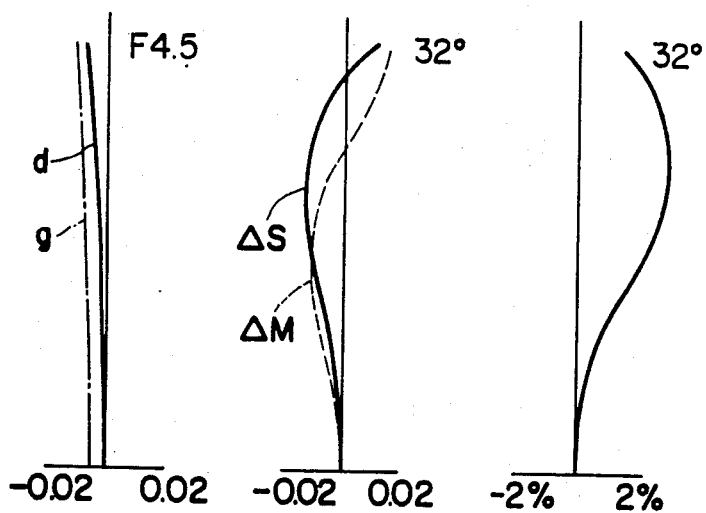
FIG. 7A SPHERICAL ABERRATION
FIG. 7B ASTIGMAISM
FIG. 7C DISTORTION
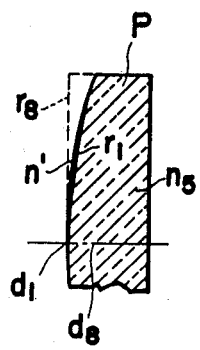
FIG. 9
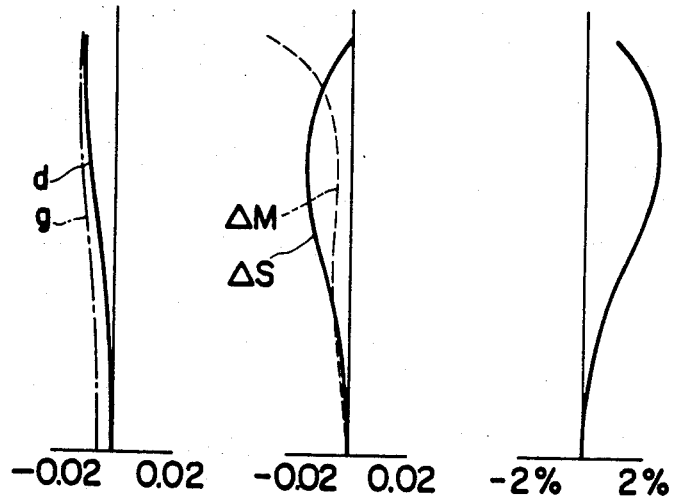
FIG. 8A SPHERICAL ABERRATION
FIG. 8B ASTIGMAISM
FIG. 8C DISTORTION

COMPACT WIDE-ANGLE PHOTOGRAPHIC LENS SYSTEM WITH A SHORT OVERALL LENGTH

BACKGROUND OF THE INVENTION a. Field of the inventions:

The present invention relates to a wide-angle photographic lens system and, more particularly, to a compact wide-angle photographic lens system with a short overall length.

b. Description of the prior art:

to design a lens system with a short overall length of a three-component four-element lens configuration or so for which aberrations are corrected favourably, it is known to form, for example, the surface on the object side or on the image side of its third lens component as an aspherical surface or to form both of said surfaces of said third lens component as asphericl surfaces. Generally, however, it is considerably difficult to manufacture aspherical lenses. Especially, it is very difficult to form a curved surface of a small radius of curvature as an aspherical surface.

SUMMARY OF THE INVENTION

It is, therefore, a primary object of the present invention to provide a compact wide-angle photographic lens system with a short overall length comprising a transparent plate member for which at least one of its surfaces is formed as an aspherical surface and which is arranged at a position between the lens component closest to the image plane and the image plane.

As shown in FIG. 1, the lens system according to the present invention is of a three-component four-element lens configuration in which a first lens component $L_1$ is a cemented doublet lens consisting of a positive lens and negative lens, a second lens component $L_2$ is a positive lens, and a third lens component $L_3$ is a negative meniscus lens with its concave surface positioned toward the object side, and further comprises a transparent plate member P arranged between said third lens component $L_3$ and image plane and having one or both surfaces formed as an aspherical surface or aspherical surfaces. Besides, said lens system according to the present invention satisfies the following conditions when reference symbol $f$ represents the focal length of the lens system as a whole, reference symbols $f_1$ and $f_3$ respectively represent focal lengths of the first lens component $L_1$ and third lens component $L_3$, and reference symbols $r_5$ and $r_6$ respectively represent radii of curvature of the surface on the image side of the second lens component $L_2$ and of the surface on the object side of the third lens component $L_3$.

1. $0.8f < f_1 < 1.7f$
2. $0.4f < -f_3 < 0.8f$
3. $0.3f < -r_5 < 0.7f$
4. $0.12f < -r_6 < 0.3f$

Moreover, for the lens system according to the present invention, at least one of surfaces of the transparent plate member P arranged between the third lens component $L_3$ and image plane is formed as an aspherical surface expressed by the following formulas (5) when the direction of the optical axis is represented by $x$ axis and the direction perpendicular to the optical axis is represented by $y$ axis.

5. $x = Ay^4 + By^6 + Cy^8 + Dy^{10}$ | $A$ | $< 5/f^3$, $B \times C < 0$

If, in the lens system of the above-mentioned configuration, the focal length $f_1$ of the first lens component $L_1$ is larger than the upper limit $1.7f$ of the condition (1), the telephoto ratio (the value obtained by dividing the distance from the first lens surface of the lens system to the image plane by the focal length of the lens system as a whole) becomes large and it becomes impossible to attain the object of the present invention to provide a lens system with a short overall length. If $f_1$ is smaller than the lower limit $0.8f$, it becomes impossible to correct aberrations favourably, even when an aspherical surface is adopted in the lens system, unless the number of lenses constituting the lens system is changed considerably.

If the focal lnegth $-f_3$ of the third lens component $L_3$ becomes larger than $0.8f$, i.e., exceeds the upper limit of the condition (2), in addition to the fact that the focal length $f_1$ of the first lens component $L_1$ is defined as shown by the condition (1), it becomes disadvantageous to make the telephoto ratio small. If, on the other hand, $-f_3$ becomes smaller than $0.4f$, i.e., smaller than the lower limit of the condition (2), it becomes impossible to correct aberrations favourably in case of the lens configuration as in the present invention.

If the surface $r_5$ on the image side of the second lens component $L_2$ becomes $-r_5 > 0.7f$ when powers of respective lenses in the lens system satisfy the above-mentioned conditions, distortion can be corrected toward minus direction. However, the meridional image plane will largely incline toward the minus side and coma of upper rays at the marginal portion will be aggravated. If, on the contrary, it becomes $-r_5 < 0.3f$, pincushion distortion will be caused considerably. Therefore, for $r_5$, it is necessary to satisfy the condition (3).

The condition (4) relates to the surface on the object side of the third lens component $L_3$. If $-r_6$ is larger than $0.3f$ when power of the third lens component $L_3$ satisfies the condition (2), coma of upper rays at the marginal portion and intermediate portion will become large. If $-r_6$ is smaller than $0.12f$, pincushion distortion will be caused and cannot be corrected even when an aspherical surface is used. ..

In addition to the above lens configuration, the present invention is arranged to provide a wide-angle lens system with a short overall length by arranging the transparent plate member P having an aspherical surface expressed by the above-mentioned formulas (5) at a position between the third lens component $L_3$ and image plane. Said transparent plate member P has an aspherical surface formed as follows. That is, at the paraxial portion and portion close to the paraxial portion, said aspherical surface is formed as a plane surface. As the distance from the paraxial portion becomes larger, said aspherical surface gently curves toward the surface on the other side of the transparent plate member P and, at the marginal portion, the aspherical surface curves shaprly toward the said direction. This aspherical surface is expressed by the above-mentioned formulas (5). By the transparent plate member P formed as above, it is arranged to correct offaxial aberrations which are considerably aggravated at the marginal portion when the field angle is large. If, in formulas (5) which express the aspherical surface of this transparent plate member P, the coefficient A becomes $|A| > 5/f^3$, the difference of the asferical surface from the plane surface at the portion close to the paraxial portion toward the intermediate portion becomes too large. As a result, aberrations at the intermediate portion are overcorrected and cannot be balanced with aberrations at the marginal portion. This is not desirable. If the product of the coefficient B and coefficient C becomes a positive value, the difference of the aspherical surface from the plane surface especially at the marginal portion becomes too large. As a result, it becomes difficult to keep aberrations at the intermediate and marginal portions balanced even when the coefficient A is made as $|A| < 5/f^3$.

By the above-mentioned transparent plate member P having an aspherical surface, it is possible to attain the above-mentioned aberration correcting effect even when its front or rear surface only is formed as the aspherical surface. When, however, both of its front and rear surfaces are formed as aspherical surfaces, aberration correcting effect will be further increased.

BRIEF DESCRIPTION OF THE DRAWINGS

FIGS. 3A, 3B and 3C respectively show graphs illustrating aberration curves of the Embodiment 2;

FIGS. 4A, 4B and 4C respectively show graphs illustrating aberration curves of the Embodiment 3;

FIGS. 5A, 5B and 5C respectively show graphs illustrating aberration curves of the Embodiment 4;

FIGS. 6A, 6B and 6C respectively show graphs illustrating aberration curves of the Embodiment 5;

FIGS. 7A, 7B and 7C respectively show graphs illustrating aberration curves of the Embodiment 6;

FIGS. 8A, 8B and 8C respectively show graphs illustrating aberration curves of the Embodiment 7; and FIG. 9 shows an example of manufacturing method of the aspherical surface.

DETAILED DESCRIPTION OF THE PREFERRED EMBODIMENTS

Figure 1:
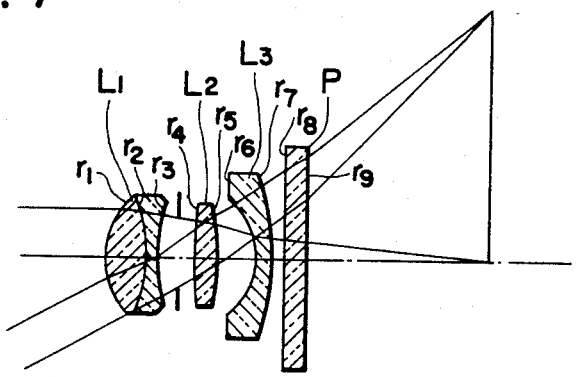
FIG. 1 shows a sectional view of the lens system according to the present invention.
Figures 2A, 2B, 2C:
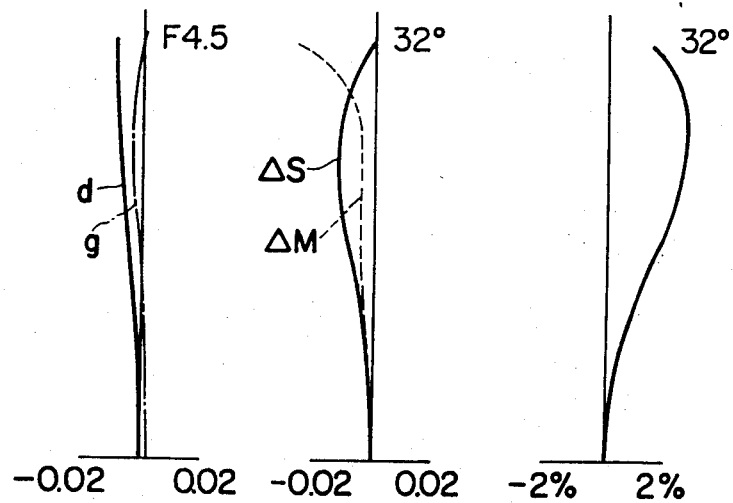
FIGS. 2A, 2B and 2C respectively show graphs illustrating aberration curves of the Embodiment 1.

Preferred embodiments of the wide-angle photographic lens system according to the present invention explained in the above are as shown below.

Embodiment 1

$f = 1$
Aperture ratio  1 : 4.5
Field angle  64°
$r_1 = 0.23094$
  $d_1 = 0.1013$    $n_1 = 1.62280$    $\nu_1 = 57.1$
$r_2 = -0.38753$
  $d_2 = 0.0203$    $n_2 = 1.83400$    $\nu_2 = 37.2$
$r_3 = 0.43402$
  $d = 0.0943$
$r_4 = 2.33484$
  $d_4 = 0.0492$    $n_3 = 1.66672$    $\nu_3 = 48.3$
$r_5 = -0.43435$
  $d_5 = 0.1010$
$r_6 = -0.17467$
  $d_6 = 0.0434$    $n_4 = 1.51633$    $\nu_4 = 64.2$
$r_7 = -0.50173$
  $d_7 = 0.0145$
$r_8 = \infty$ (Aspherical surface)
  $d_8 = 0.0579$    $n_5 = 1.51633$    $\nu_5 = 64.2$
$r_9 = \infty$
A = 0.42281,   B = 28.223,   C = -238.46
D = -36.904
$f_1 = 1.4424$,   $f_2 = 0.5532$,   $f_3 = -0.5435$
S' = 0.446,   p = 0.928

Embodiment 2

$f = 1$
Aperture ratio  1 : 4.5
Field angle  64°
$r_1 = 0.23868$
  $d_1 = 0.1013$    $n_1 = 1.62230$    $\nu_1 = 53.2$
$r_2 = -0.33877$
  $d_2 = 0.0203$    $n_2 = 1.78300$    $\nu_2 = 36.2$
$r_3 = 0.4423$
  $d_3 = 0.0949$
$r_4 = 5.81158$
  $d_4 = 0.0492$    $n_3 = 1.66672$    $\nu_3 = 48.3$
$r_5 = -0.40196$
  $d_5 = 0.1016$
$r_6 = -0.17533$
  $d_6 = 0.0463$    $n_4 = 1.62041$    $\nu_4 = 60.3$
$r_7 = -0.41661$
  $d_7 = 0.0145$
$r_8 = \infty$ (Aspherical surface)
  $d_8 = 0.0579$    $n_5 = 1.51633$    $\nu_5 = 64.2$
$r_9 = \infty$
A = -0.07209,   B = 45.731,   C = -385.22
D = -61.136
$f_1 = 1.2841$,   $f_2 = 0.5658$,   $f_3 = -0.5268$
S' = 0.445,   p = 0.931

Embodiment 3

$f = 1$
Aperture ratio  1 : 4.5
Field angle  64°
$r_1 = 0.23348$
  $d_1 = 0.1016$    $n_1 = 1.62280$    $\nu_1 = 57.1$
$r_2 = -0.38780$
  $d_2 = 0.0203$    $n_2 = 1.83400$    $\nu_2 = 37.2$
$r_3 = 0.53683$
  $d_3 = 0.0947$
$r_4 =$
  $d_4 = 0.0493$    $n_3 = 1.66672$    $\nu_3 = 48.3$
$r_5 = -0.40185$
  $d_5 = 0.1011$
$r_6 = -0.16154$
  $d_6 = 0.0435$    $n_4 = 1.62041$    $\nu_4 = 60.3$
$r_7 = -0.39902$
  $d_7 = 0.0145$
$r_8 = \infty$ (Aspherical surface)
  $d_8 = 0.0580$    $n_5 = 1.51633$    $\nu_5 = 64.2$
$r_9 = \infty$
A = 1.9575,   B = 4.7586,   C = -81.660
D = -13.397
$f_1 = 1.0422$,   $f_2 = 0.6014$,   $f_3 = -0.4694$
S' = 0.417,   p = 0.900

Embodiment 4

$f = 1$
Aperture ratio  1 : 4.5
Field angle  64°
$r_1 = 0.23341$
  $d_1 = 0.1013$    $n_1 = 1.62280$    $\nu_1 = 57.1$
$r_2 = -0.37997$
  $d_2 = 0.0203$    $n_2 = 1.83400$    $\nu_2 = 37.2$
$r_3 = 0.43926$
  $d_3 = 0.0948$
$r_4 = 2.27030$
  $d_4 = 0.0492$    $n_3 = 1.66672$    $\nu_3 = 48.3$
$r_5 = -0.42573$
  $d_5 = 0.1008$
$r_6 = -0.17875$
  $d_6 = 0.0434$    $n_4 = 1.51633$    $\nu_4 = 64.2$
$r_7 = -0.54311$
  $d_7 = 0.0145$
$r_8 = \infty$
  $d_8 = 0.0579$    $n_5 = 1.51633$    $\nu_5 = 64.2$
$r_9 = \infty$ (Aspherical surface)
A = 0.02833,   B = -21.007,   C = 105.56
D = 22.669
$f_1 = 1.4987$,   $f_2 = 0.5427$,   $f_3 = -0.5389$
S' = 0.449,   p = 0.931

Embodiment 5

$f = 1$
Aperture ratio  1 : 4.5

-continued

Embodiment 5

Field angle 64°
$r_1 = 0.22394$
 $d_1 = 0.1017$  $n_1 = 1.62280$  $\nu_1 = 57.1$
$r_2 = -0.50057$
 $d_2 = 0.0177$  $n_2 = 1.83400$  $\nu_2 = 37.2$
$r_3 = 0.47527$
 $d_3 = 0.0947$
$r_4 = 12.0754$
 $d_4 = 0.0494$  $n_3 = 1.66672$  $\nu_3 = 48.3$
$r_5 = -0.55765$
 $d_5 = 0.1017$
$r_6 = -0.15399$
 $d_6 = 0.0436$  $n_4$ 0.0434  $\nu_4 = 64.2$
$r_7 = -0.32699$
 $d_7 = 0.0145$
$r_8 = \infty$ (Aspherical surface)
 $d_8 = 0.0581$  $n_5 = 1.51633$  $\nu_5 = 64.2$
$r_9 = \infty$
A = 2.5225,  B = −21.599,  C = 188.31
D = 19.270
$f_1 = 0.9758$,  $f_2 = 0.8007$,  $f_3 = -0.6166$
S' = 0.424,  p = 0.905

Embodiment 6 f = 1
Aperture ratio 1 : 4.5
Field angle 64°
$r_1 = 0.26170$
 $d_1 = 0.1013$  $n_1 = 1.62230$  $\nu_1 = 53.2$
$r_2 = -0.37379$
 $d_2 = 0.0203$  $n_2 = 1.78300$  $\nu_2 = 36.2$
$r_3 = 0.73454$
 $d_3 = 0.0965$
$r_4 = -0.67440$
 $d_4 = 0.0492$  $n_3 = 1.66672$  $\nu_3 = 48.3$
$r_5 = -0.30235$
 $d_5 = 0.1027$
$r_6 = -0.15002$
 $d_6 = 0.0434$  $n_4 = 1.51633$  $\nu_4 = 64.2$
$r_7 = -0.33843$
 $d_7 = 0.0145$
$r_8 = \infty$ (Aspherical surface)
 $d_8 = 0.0579$  $n_5 = 1.51633$  $\nu_5 = 64.2$
$r_9 = \infty$
A = 2.4878,  B = 0.6161,  C = −78.464
D = −1.5304
$f_1 = 0.8861$,  $f_2 = 0.7807$,  $f_3 = -0.5663$
S' = 0.445,  p = 0.931

Embodiment 7 f = 1
Aperture ratio 1 : 45
Field angle 64°
$r_1 = 0.24217$
 $d_1 = 0.1159$  $n_1 = 1.62230$  $\nu_1 = 53.2$
$r_2 = -0.39139$
 $d_2 = 0.0145$  $n_2 = 1.83400$  $\nu_2 = 37.2$
$r_3 = 0.44949$
 $d_3 = 0.0985$
$r_4 = 2.69376$
 $d_4 = 0.0507$  $n_3 = 1.70000$  $\nu_3 = 48.1$
$r_5 = -0.46019$
 $d_5 = 0.1014$
$r_6 = -0.18870$
 $d_6 = 0.0435$  $n_4 = 1.51633$  $\nu_4 = 64.2$
$r_7 = -0.52266$
 $d_7 = 0.0145$
$r_8 = \infty$
 $d_8 = 0.0580$  $n_5 = 1.51633$  $\nu_5 = 64.2$
$r_9 = \infty$ (Aspherical surface)
A = −0.01257,  B = −16.272,  C = 60.204
D = 13.853
$f_1 = 1.5514$,  $f_2 = 0.5652$,  $f_3 = -0.6037$
S' = 0.450,  p = 0.946

In the above-mentioned respective embodiments, reference symbols $r_1$ through $r_9$ respectively represent radii of curvature of respective surfaces of respective lenses and transparent plate member, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol S' represents the distance from the final lens surface of the lens system to the image plane, reference symbol p represents the telephoto ratio, and reference symbols A, B, C and D respectively represent coefficients in formulas (5).

As manufacturing methods to form an aspherical surface of the transparent plate member in the lens system according to the present invention, it may be possible, in addition to the method to form an aspherical surface directly from a glass plate, to form an aspherical surface from a plane surface by utilizing thermoplasticity of glass material and to form an aspherical surface by forming of plastics. Besides, it may be also possible to form an aspherical surface by sticking a thin aspherical layer of plastics onto a basic spherical lens having a suitable radius of curvature or to form an aspherical surface by forming an aspherical layer by evaporating a glass material for evaporation onto the surface of the basic spherical lens.

An example of numerical values for forming an aspherical surface from a spherical surface by the above methods is shown below. In this example, numerical values become as follows when, as shown in FIG. 9, reference symbols $r_8$ and $r_9$ respectively represent both plane surfaces, reference symbol r' represents the radius of curvature of the basic spherical lens, reference symbol d' represents the thickness of the aspherical layer on the optical axis, and reference symbol n' represents the refractive index of the glass for evaporation.

(Example)
$r_8 = \infty$  (Aspherical surface)
 d' = 0  n' = 1.469
r' = 7.47470
 $d_8 = 0.0578$  $n_5 = 1.51633$
$r_9 = \infty$
A = 0.47573
B = 30.539
C = −260.82
D = −40.392

Besides, thicknesses of the aspherical layer in the above example corresponding to various values of y and x in formulas (5) become as shown below.

| y | x | Thickness of aspherical layer |
|---|---|---|
| 0 | 0 | 0 |
| 0.05 | 0.0000022 | 0.0001333 |
| 0.10 | 0.0000595 | 0.0005442 |
| 0.15 | 0.0004430 | 0.0009635 |
| 0.20 | 0.0022377 | 0.0005235 |
| 0.228 | 0.0033249 | 0 |
| 0.25 | 0.0049018 | |

In the above example, the aspherical layer is formed in the range of 0.456 diameter on the front surface of the transparent plate member P.

As explained in the above and illustrated by respective embodiments, the present invention provides a compact wide-angle photographic lens system with a short overall length for which aberrations are corrected extremely favourably. Besides, the aspherical surface adopted in the lens system according to the present invention is formed from a plane surface of a transparent plate member and, therefore, can be formed by an extremely simple method as illustrated by the example shown in FIG. 9.

I claim:

1. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being negative meniscus lens with its concave surface positioned toward the object side, said compact wide-angle photographic lens system with a short overall length satisfying the following conditions (1) through (4), said transparent plate member being arranged between said third lens component and image plane and having at least one surface formed as an aspherical surface expressed by the following formulas (5) when the direction of the optical axis is represented by $x$ axis and the direction perpendicular to the optical axis is represented by $y$ axis:

1. $0.8f < f_1 \, 1.56f$
2. $0.46f < -f_3 < 0.62f$
3. $0.30f < -r_5 < 0.56f$
4. $0.15f < -r_6 < 0.19f$
5. $x = Ay^4 + By^6 + Cy^8 + Dy^{10}$ $|A| < 5/f^3$, $B \times C < 0$ wherein reference symbol $f$ represents the focal length of the lens system as a whole, reference symbols $f_1$ and $f_3$ respectively represent focal lengths of the first and third lens components, and reference symbols $r_5$ and $r_6$ respectively represent radii of curvature of the surface on the image side of the second lens component and of the surface of the object side of the third lens component.

2. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being a negative meniscus lens with its concave surface positioned toward the object side, said compact wide-angle photographic lens system with a short overall length having numerical values as given below, said transparent plate member being arranged between said third lens component and image plane and having its front surface formed as an aspherical surface expressed by formula given below when the direction of the optical axis is represented by $x$ axis and the direction perpendicular to the optical axis is represented by $y$ axis:

| | | |
|---|---|---|
| $f = 1$ | | |
| Aperture ratio | 1 : 4.5 | |
| Field angle | 64° | |
| $r_1 = 0.23094$ | | |
| $d_1 = 0.1013$ | $n_1 = 1.62280$ | $\nu_1 = 57.1$ |
| $r_2 = -0.38753$ | | |
| $d_2 = 0.0203$ | $n_2 = 1.83400$ | $\nu_2 = 37.2$ |
| $r_3 = 0.43402$ | | |
| $d_3 = 0.0943$ | | |
| $r_4 = 2.33484$ | | |
| $d_4 = 0.0492$ | $n_3 = 1.66672$ | $\nu_3 = 48.3$ |
| $r_5 = -0.43435$ | | |
| $d_5 = 0.1010$ | | |
| $r_6 = -0.17467$ | | |
| $d_6 = 0.0434$ | $n_4 = 1.51633$ | $\nu_4 = 64.2$ |
| $r_7 = -0.50173$ | | |
| $d_7 = 0.0145$ | | |
| $r_8 = \infty$ (Aspherical surface) | | |
| $d_8 = 0.0579$ | $n_5 = 1.51633$ | $\nu_5 = 64.2$ |
| $r_9 = \infty$ | | |
| $x = Ay^4 + By^6 + Cy^8 + Dy^{10}$ | | |
| $A = 0.42281$, | $B = 28.223$, | $C = -238.46$ |
| $D = -36.904$ | | |
| $f_1 = 1.4424$, | $f_2 = 0.5532$, | $f_3 = -0.5435$ |
| $S' = 0.446$, | $p = 0.928$ | | wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $S'$ represents the distance from the final lens surface of the lens system to the image plane, reference symbol $p$ represents the telephoto ratio, and reference symbols A, B, C and D, respectively represent coefficients in the above formulas.

3. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being a negative meniscus lens with its concave surface positioned toward the object side, said compact wide-angle photographic lens system with a short overall length having numerical values as given below, said transparent plate member being arranged between said third lens component and image plane and having its front surface formed as an aspherical surface expressed by formula given below when the direction of the optical axis is represented by $x$ axis and the direction perpendicular to the optical axis is represented by $y$ axis:

| | | |
|---|---|---|
| $f = 1$ | | |
| Aperture ratio | 1 : 4.5 | |
| Field angle | 64° | |
| $r_1 = 0.23868$ | | |
| $d_1 = 0.1013$ | $n_1 = 1.62230$ | $\nu_1 = 53.2$ |
| $r_2 = -0.33877$ | | |
| $d_2 = 0.0203$ | $n_2 = 1.78300$ | $\nu_2 = 36.2$ |
| $r_3 = 0.4423$ | | |
| $d_3 = 0.0949$ | | |
| $r_4 = 5.81158$ | | |
| $d_4 = 0.0492$ | $n_3 = 1.66672$ | $\nu_3 = 48.3$ |
| $r_5 = -0.40196$ | | |
| $d_5 = 0.1016$ | | |
| $r_6 = -0.17533$ | | |
| $d_6 = 0.0463$ | $n_4 = 1.62041$ | $\nu_4 = 60.3$ |
| $r_7 = -0.41661$ | | |
| $d_7 = 0.0145$ | | |
| $r_8 = \infty$ (Aspherical surface) | | |
| $d_8 = 0.0579$ | $n_5 = 1.51633$ | $\nu_5 = 64.2$ |
| $r_9 = \infty$ | | |
| $x = Ay^4 + By^6 + Cy^8 + Dy^{10}$ | | |
| $A = -0.07209$, | $B = 45.731$, | $C = -385.22$ |
| $D = -61.136$ | | |
| $f_1 = 1.2841$, | $f_2 = 0.5658$, | $f_3 = -0.5268$ |
| $S' = 0.445$, | $p = 0.931$ | | wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols, $\nu_1$ through $\nu_5$ respectively represent Abbe's numbers of respective lenses, reference symbol $S'$ represents the distance from the final lens surface of the lens system to the image plane, reference symbol $p$ represents the telephoto ratio, and reference symbols A, B, C and D respectively represent coefficients in the above formulas.

4. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being a negative meniscus lens with its concave surface positioned toward the object side, said compact wide-angle photographic lens system with a short overall length having numerical values as given below, said transparent plate member being arranged between said third lens component and image plane and having its front surface formed as an aspherical surface expressed by formula given below when the direction of the optical axis is represented by x axis and the direction perpendicular to the optical axis is represented by y axis:

$f = 1$
Aperture ratio  $1 : 4.5$
Field angle  $64°$
$r_1 = 0.23348$
  $d_1 = 0.1016$  $n_1 = 1.62280$  $\nu_1 = 57.1$
$r_2 = -0.38780$
  $d_2 = 0.0203$  $n_2 = 1.83400$  $\nu_2 = 37.2$
$r_3 = 0.53683$
  $d_3 = 0.0947$
$r_4 = \infty$
  $d_4 = 0.0493$  $n_3 = 1.66672$  $\nu_3 = 48.3$
$r_5 = -0.40185$
  $d_5 = 0.1011$
$r_6 = -0.16154$
  $d_6 = 0.0435$  $n_4 = 1.62041$  $\nu_4 = 60.3$
$r_7 = -0.39902$
  $d_7 = 0.0145$
$r_8 = \infty$ (Aspherical surface)
  $d_8 = 0.0580$  $n_5 = 1.51633$  $\nu_5 = 64.2$
$r_9 = \infty$
  $x = Ay^4 + By^6 + Cy^8 + Dy^{10}$
  $A = 1.9575$,  $B = 4.7586$,  $C = -81.660$
  $D = -13.397$
  $f_1 = 1.0422$,  $f_2 = 0.6014$,  $f_3 = -0.4694$
  $S' = 0.417$,  $p = 0.900$ wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $S'$ represents the distance from the final lens surface of the lens system to the image plane, reference symbol $p$ represents the telephoto ratio, and reference symbols A, B, C and D respectively represent coefficients in the above formulas.

5. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens being a negative meniscus lens with its concave surface positioned toward the object side, said compact wide-angle photographic lens system with a short overall length having numerical values as given below, said transparent plate member being arranged between said third lens component and image plane and having its rear surface formed as an aspherical surface expressed by formula given below when the direction of the optical axis is represented by x axis and the direction perpendicular to the optical axis is represented by y axis:

$f = 1$
Aperture ratio  $1 : 4.5$
Field angle  $64°$
$r_1 = 0.23341$
  $d_1 = 0.1013$  $n_1 = 1.62280$  $\nu_1 = 57.1$
$r_2 = -0.37997$
  $d_2 = 0.0203$  $n_2 = 1.83400$  $\nu_2 = 37.2$
$r_3 = 0.43926$
  $d_3 = 0.0948$
$r_4 = 2.27030$
  $d_4 = 0.0492$  $n_3 = 1.66672$  $\nu_3 = 48.3$
$r_5 = -0.42573$
  $d_5 = 0.1008$
$r_6 = -0.17875$
  $d_6 = 0.0434$  $n_4 = 1.51633$  $\nu_4 = 64.2$
$r_7 = -0.54311$
  $d_7 = 0.0145$
$r_8 = \infty$
  $d_8 = 0.0579$  $n_5 = 1.51633$  $\nu_5 = 64.2$
$r_9 = \infty$ (Aspherical surface)
  $x = Ay^4 + By^6 + Cy^8 + Dy^{10}$
  $A = 0.02833$,  $B = -21.007$,  $C = 105.56$
  $D = 22.669$
  $f_1 = 1.4987$,  $f_2 = 0.5427$,  $f_3 = -0.5389$
  $S' = 0.449$,  $p = 0.931$ wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $S'$ represents the distance from the final lens surface of the lens system to the image plane, reference symbol $p$ represents the telephoto ratio, and reference symbols A, B, C and D respectively represent coefficients in the above formulas.

6. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being a negative meniscus lens with its concave surface positioned toward the object side, said compact wide-angle photographic lens system with a short overall length having numerical values as given below, said transparent plate member being arranged between said third lens component and image plane and having its front surface as an aspherical surface expressed by formula given below when the direction of the optical axis is represented by x axis and the direction perpendicular to the optical axis is represented by y axis:

$f = 1$
Aperture ratio  $1 : 4.5$
Field angle  $64°$
$r_1 = 0.22394$
  $d_1 = 0.1017$  $n_1 = 1.62280$  $\nu_1 = 57.1$
$r_2 = -0.50057$
  $d_2 = 0.0177$  $n_2 = 1.83400$  $\nu_2 = 37.2$
$r_3 = 0.47527$
  $d_3 = 0.0947$
$r_4 = 12.0754$
  $d_4 = 0.0494$  $n_3 = 1.66672$  $\nu_3 = 48.3$
$r_5 = -0.55765$
  $d_5 = 0.1017$ -continued

| | | |
|---|---|---|
| $r_6 = -0.15399$ | | |
| $d_6 = 0.0436$ | $n_4 = 1.51633$ | $\nu_4 = 64.2$ |
| $r_7 = -0.32699$ | | |
| $d_7 = 0.0145$ | | |
| $r_8 = \infty$ (Aspherical surface) | | |
| $d_8 = 0.0581$ | $n_5 = 1.51633$ | $\nu_5 = 64.2$ |
| $r_9 = \infty$ | | |
| $x = Ay^4 + By^6 + Cy^8 + Dy^{10}$ | | |
| A = 2.5225, | B = −21.599, | C = 188.31 |
| D = 19.270 | | |
| $f_1 = 0.9758$, | $f_2 = 0.8007$, | $f_3 = -0.6166$ |
| $S' = 0.424$, | $p = 0.905$ | | wherein reference sumbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol S' represents the distance from the final lens surface of the lens system to the image plane, reference symbol p represents the telephoto ratio, and reference symbols A, B, C and D respectively represent coefficients in the above formulas.

7. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being a negative meniscus lens with its concave surface positioned toward the object side, said compact wide-angle photographic lens system with a short overall length having numerical values as given below, said transparent plate member being arranged between said third lens component and image plane and having its front surface formed as an aspherical surface expressed by formula given below when the direction of the optical axis is represented by x axis and the direction perpendicular to the optical axis is represented by y axis:

| | | |
|---|---|---|
| f = 1 | | |
| Aperture ratio | 1 : 4.5 | |
| Field angle | 64° | |
| $r_1 = 0.26170$ | | |
| $d_1 = 0.1013$ | $n_1 = 1.62230$ | $\nu_1 = 53.2$ |
| $r_2 = -0.37379$ | | |
| $d_2 = 0.0203$ | $n_2 = 1.78300$ | $\nu_2 = 36.2$ |
| $r_3 = 0.73454$ | | |
| $d_3 = 0.0965$ | | |
| $r_4 = -0.67440$ | | |
| $d_4 = 0.0492$ | $n_3 = 1.66672$ | $\nu_3 = 48.3$ |
| $r_5 = -0.30235$ | | |
| $d_5 = 0.1027$ | | |
| $r_6 = -0.15002$ | | |
| $d_6 = 0.0434$ | $n_4 = 1.51633$ | $\nu_4 = 64.2$ |
| $r_7 = -0.33843$ | | |
| $d_7 = 0.0145$ | | |
| $r_8 = \infty$ (Aspherical surface) | | |
| $d_8 = 0.0579$ | $n_5 = 1.51633$ | $\nu_4 = 64.2$ |
| $r_9 = \infty$ | | |
| $x = Ay^4 + By^6 + Cy^8 + Dy^{10}$ | | |
| A = 2.4878, | B = 0.6161, | C = −78.464 |
| D = −1.5304 | | |
| $f_1 = 0.8861$, | $f_2 = 0.7807$, | $f_3 = -0.5663$ |
| $S' = 0.445$, | $p = 0.931$ | | wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol S' represents the distance from the final lens surface of the lens system to the image plane, reference symbol p represents the telephoto ratio, and reference symbols A, B, C and D respectively represent coefficients in the above formulas.

8. A compact wide-angle photographic lens system with a short overall length comprising: a first, second and third lens components and a transparent plate member, said first lens component being a cemented doublet lens consisting of a positive lens and negative lens, said second lens component being a positive lens, and said third lens component being a negative meniscus lens with its concave surface positioned toward the object side, said compact wide-angle photographic lens system with a short overall length having numerical values as given below, said transparent plate member being arranged between said third lens component and image plane and having its rear surface formed as an aspherical surface expressed by formulas given below when the direction of the optical axis is represented by x axis and the direction perpendicular to the optical axis is represented by y axis:

| | | |
|---|---|---|
| f = 1 | | |
| Aperture ratio | 1 : 4.5 | |
| Field angle | 64° | |
| $r_1 = 0.24217$ | | |
| $d_1 = 0.1159$ | $n_1 = 1.62230$ | $\nu_1 = 53.2$ |
| $r_2 = -0.39139$ | | |
| $d_2 = 0.0145$ | $n_2 = 1.83400$ | $\nu_2 = 37.2$ |
| $r_3 = 0.44949$ | | |
| $d_3 = 0.0985$ | | |
| $r_4 = 2.69376$ | | |
| $d_4 = 0.0507$ | $n_3 = 1.70000$ | $\nu_3 = 48.1$ |
| $r_5 = -0.46019$ | | |
| $d_5 = 0.1014$ | | |
| $r_6 = -0.18870$ | | |
| $d_6 = 0.0435$ | $n_4 = 1.51633$ | $\nu_4 = 64.2$ |
| $r_7 = -0.52266$ | | |
| $d_7 = 0.0145$ | | |
| $r_8 = \infty$ | | |
| $d_8 = 0.0580$ | $n_5 = 1.51633$ | $\nu_5 = 64.2$ |
| $r_9 = \infty$ (Aspherical surface) | | |
| $x = Ay^4 + By^6 + Cy^8 + Dy^{10}$ | | |
| A = −0.01257, | B = −16.272, | C = 60.204 |
| D = 13.853 | | |
| $f_1 = 1.5514$, | $f_2 = 0.5652$, | $f_3 = -0.6037$ |
| $S' = 0.450$, | $p = 0.946$ | | wherein reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol S' represents the distance from the final lens surface of the lens system to the image plane, reference symbol p represents the telephoto ratio, and reference symbols A, B, C and D respectively represent coefficients in the above formulas.

* * * * *